May 22, 1956 J. S. MICHIE ET AL 2,746,816
LUBRICATED EXPANSIBLE V-PULLEY STRUCTURE
Filed April 2, 1953
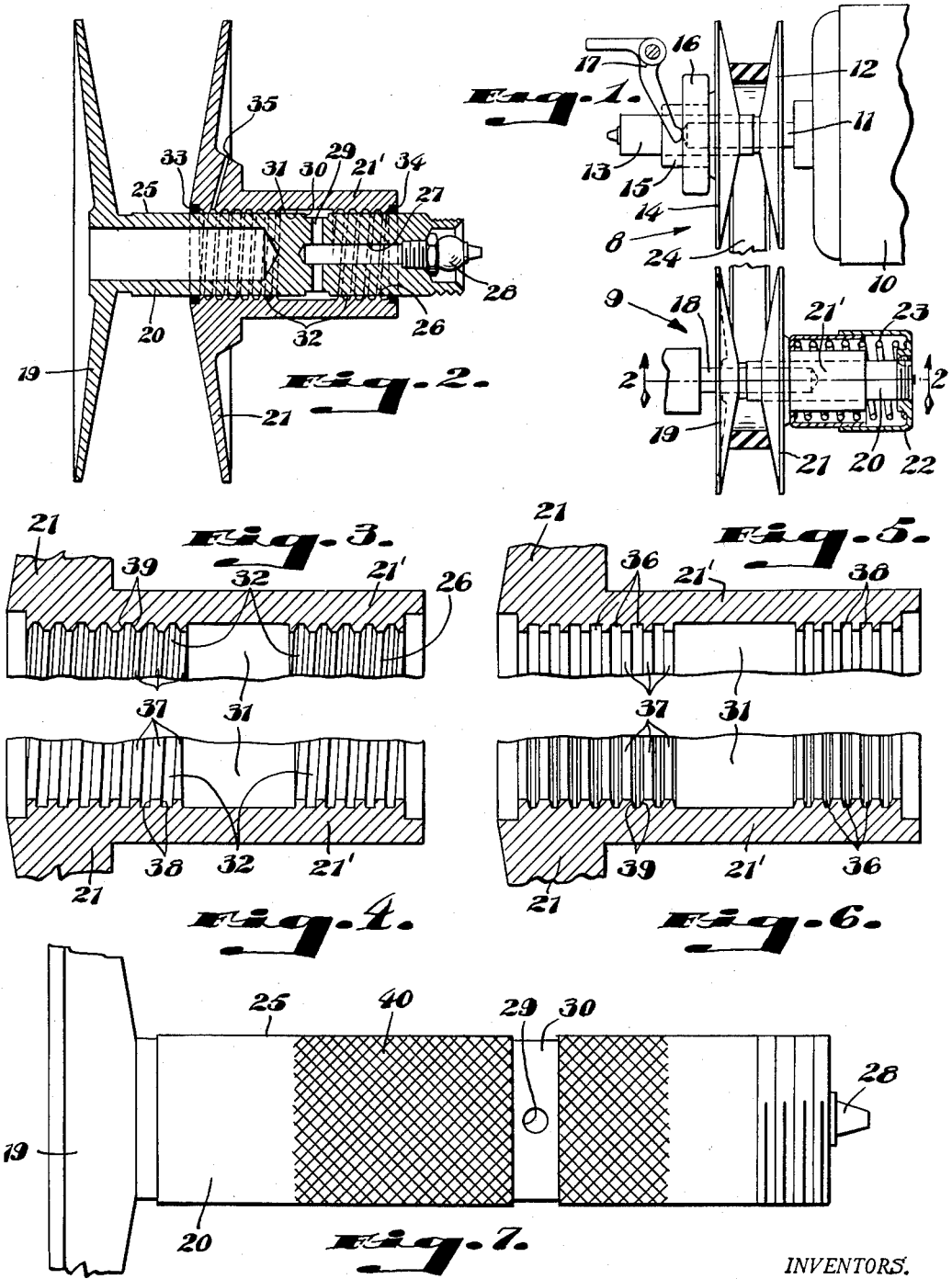
INVENTORS.
JOHN S. MICHIE and
ADAM LENARD EVERROAD,
BY: Harold B. Hood.
ATTORNEY.

United States Patent Office 2,746,816
Patented May 22, 1956

2,746,816

LUBRICATED EXPANSIBLE V-PULLEY STRUCTURE

John S. Michie and Adam L. Everroad, Columbus, Ind., assignors, by mesne assignments, to The Reliance Electric and Engineering Company, Cleveland, Ohio, a corporation of Ohio Application April 2, 1953, Serial No. 346,360

9 Claims. (Cl. 308—5)

The present invention relates primarily to a means for maintaining proper lubrication between the surfaces of two elements mounted one on the other for intermittent axial movement relative to one another.

In the environment for which our invention is primarily intended for use, one coned disc of an expansible V-pulley used in a speed varying mechanism, is fixed to a shaft and has a hub on which is mounted, for axial movement, a second coned disc coacting with the other disc. In many applications of such a device, the mechanism will be set to operate at a certain speed and the relative positions of the coned discs of the V-pulleys therein remain unchanged for long periods of time. The problem of lubricating the sliding surfaces between the two discs has long presented a difficult problem, since, after sitting in one position for such long periods of time, the lubricant becomes hardened and subsequent shifting of the discs becomes very difficult, and sometimes impossible without completely shutting down the mechanism.

The primary object of our invention is, therefore, to provide an expansible V-pulley structure for use in the above or similar environments, in which such a problem exists, so constructed that proper lubrication will be maintained between the sliding surfaces thereof even after long periods of unchanged relation between the relatively shiftable parts of the pulley or other structure.

A further object is to provide a pulley structure in which the possibility of "freezing" against relative axial adjustment will be eliminated.

Further objects will become apparent as the description proceeds.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a more or less diagrammatic illustration of a variable speed mechanism in which our invention is intended primarily for use;

Fig. 2 is a sectional view taken substantially on line 2—2 of Fig. 1 and showing a preferred form of our invention;

Fig. 3 is a fragmentary perspective view of the form of our invention in Fig. 2, but drawn on an enlarged scale;

Fig. 4 is a view similar to Fig. 3 showing a further form of our invention;

Fig. 5 is a further view similar to Fig. 3 showing a still further form of our invention;

Fig. 6 is another view similar to Fig. 4 showing still another form of our invention; and Fig. 7 is an enlarged fragmentary elevation of one of the shiftable elements of the pulley of Fig. 2 embodying a modified form of our invention.

Referring more particularly to the drawings, and especially to Figs. 1 and 2, it will be seen that we have illustrated, somewhat diagrammaticaly, one form of a more or less conventional variable speed mechanism of the expansible V-pulley type. A motor 10 has fixed to its shaft 11 one coned disc 12 of an expansible V-pulley 8. Said disc is provided with a central hub 13 on which is slidably mounted a second coned disc 14 having a central hub 15 surrounding hub 13. Heretofore, it has been thought essential, to the satisfactory operation of a device of this type, that the two discs be keyed together against relative rotation. We have found, however, that the mechanism will perform its intended function equally as well, and a good deal better for the purpose of our invention, if the two discs are left free for relative rotation, a fact which will later become apparent.

To provide means for shifting disc 14 toward disc 12, a bearing 16 is provided on hub 15, and a bell-crank 17, or the like, is provided to engage bearing 16 to provide an anti-friction connection between the crank 17 and disc 14.

A driven shaft 18 has fixed thereon another coned disc 19, of a second expansible V-pulley 9, provided with a central hub 20. A mating coned disc 21 is slidably mounted on hub 20 and is in turn provided with a central hub 21' surrounding hub 20. A cup element 22 is fixed to the end of hub 20 and supports one end of a coiled spring 23, the other end of which bears against disc 21 to resiliently urge it toward disc 19. An edge-active V-belt 24 provides a driving connection between pulleys 8 and 9.

As explained heretofore, in certain uses of such a mechanism, the device is set to drive shaft 18 at a given speed and this setting remains unchanged for long periods of time. Thus, lubricant placed between the outer surface 25 of hub 20 and the inner surface 26 of the bore in hub 21', will become congealed and hardened. Subsequent axial shifting of the discs is very difficult.

In such a structure, it is more or less conventional practice to introduce lubricant between the intimate surfaces 25 and 26 by providing hub 20 with a central bore 27 into the outer end of which is placed a conventional grease fitting 28. A transaxial bore 29 intersects bore 27 and opens through the surface 25 of hub 20. A peripheral groove 30 is usually provided in hub 20 in registry with bore 29. Grease forced into bore 27 will flow through bore 29 and then between the few thousandths clearance provided between the surfaces 25 and 26. Thus, it will be seen that frequent applications of lubricant must be provided in such a structure in order to maintain this thin film of grease between the said surfaces.

As stated above, we have found that mechanisms of this type will work equally as well when the discs of the V-pulleys are left unkeyed and free for relative rotation. Thus, although such rotation is very slight during operation of the mechanism, it is sufficient to prevent "freezing" together of the disc portions due to the hardening of the lubricant between the intimate surfaces thereof. This alone, however, does not provide any more complete lubrication between such surfaces.

We have found that if, in addition to permitting slight relative rotation between the two discs, we groove the internal surface of the hub 21' throughout its axial extent, we provide such an amount of lubricant between the two surfaces that the lubricant need be replaced or replenished only about one-tenth as often as heretofore required.

To this end, we have found that several groove forms will accomplish our purpose, but we have found the optimum form to be that of a spiral groove 32 extending axially through bore 26. (See Figs. 3 and 4.) Preferably, but not necessarily, we provide a relatively wide, peripheral groove 31 midway between the ends of hub 21' to provide an initial reservoir for lubricant issuing from bore 29.

During lubrication, grease will be forced into groove 31 and then into groove 32 completely filling the same. During operation of the mechanism, the grease will be spread across the surface of hub 20 by the slight relative rotation of discs 19 and 21.

In some applications it has been found desirable to provide packings 33 and 34 (see Fig. 2) at opposite ends of bore 26 to prevent the escape of lubricant therefrom. An escape passage 35 can be provided to permit the escape of excess lubricant during the lubrication process.

We have found that by making the groove in the form of a series of concentric, axially spaced grooves 36 (see Figs. 5 and 6), during such relative rotation of discs 19 and 21, the grease will spill from one groove to the other thereby properly lubricating the intimate surfaces of hubs 20 and 21'. From a manufacturing standpoint, however, the spiral groove 32 has proven the least costly and is, therefore, to be preferred over the individual grooves 36.

The width of the lands 37 separating the adjacent turns of groove 32 and the adjacent grooves 36, has been found to be critical in most applications. Widths in excess of one-sixteenth inch have proven, in most instances, too great to permit the proper distribution of the lubricant along hub surface 25, although lands having widths greater than one-sixteenth inch do greatly improve the lubrication of the surfaces over that obtainable in conventional structures. When the optimum land-widths are used, however, it is found that "spillage" of lubricant from adjacent grooves will meet, substantially at the center of the intervening land, whereby complete lubrication between the telescopically-associated surfaces is attained.

We have found that whereas grooves which have the opposite walls 38 thereof (see Figs. 4 and 5) substantially perpendicular, in cross section, to the axis of bore 26 will provide the necessary lubrication, the sharp corners thus formed will have a tendency to crumble thereby introducing, in time, fine particles of metal into the lubricant in the grooves necessitating the complete replacement of this lubricant at certain intervals. If, however, the opposite walls 39 (see Figs. 3 and 6) are formed to converge from the lands toward the floor of the grooves, this difficulty is very greatly reduced.

While the form of our invention thus described has proven to be optimum, we have found that similar, though less satisfactory, results can be had by knurling a portion of the hub 20 of disc 19 (see Fig. 7). Lubricant will flow into the grooves formed by the knurling. Here, too, the sharp edges formed by the knurling have a tendency to crumble, in time, resulting in the undesirable result present in the forms of Figs. 4 and 5. In spite of this, however, the use of this form of our invention has proven a decided improvement over present structures, though not so spectacular as that of our stated optimum form.

By the use of our invention, lubrication between the sliding surfaces of the V-pulleys of a variable speed mechanism is greatly improved; "freezing" together of the pulley discs is eliminated; and the pulleys may go for as long as ten times the length of time between lubrications as has heretofore been possible.

We claim as our invention:

1. A first rotary element, a second rotary element, one of said elements having an axial bore and the other of said elements having a cylindrical portion disposed within said bore in intimate contact with the walls thereof to mount said one element for axial movement relative to said other element, and means for introducing lubricant between the intimate surfaces of said elements, the said intimate surface of one of said elements being peripherally grooved substantially throughout the axial extent of said surface for receiving and retaining lubricant, and the lands between axially-adjacent groove sections having an axial dimension not substantially exceeding one-sixteenth inch.

2. A first element having a cylindrical portion and mounted for rotation about the axis of said portion, a second element having an axial bore therein and sleeved on said portion for rotation relative thereto and for axial movement relative to said first element, the walls of said bore in said second element being peripherally grooved substantially throughout the axial extent of said bore for receiving lubricant, and the lands between axially-adjacent groove sections having an axial dimension not substantially exceeding one-sixteenth inch.

3. A first element having a cylindrical portion and mounted for rotation about the axis of said portion, and a second element having an axial bore therein and sleeved on said portion for axial movement relative to said first element, the walls of said bore in said second element being formed with an axially-extending spiral groove for receiving and retaining lubricant, and the lands between adjacent turns of said spiral groove having an axial dimension not substantially exceeding one-sixteenth inch.

4. The device of claim 3 in which the opposite walls of said spiral groove converge, in cross section, from the lands toward the floor of said groove.

5. The device of claim 3 in which the opposite walls of said groove are, in cross section, substantially perpendicular to the axis of said bore.

6. A first element having a cylindrical portion and mounted for rotation about the axis of said portion, and a second element having an axial bore therein and sleeved on said portion for axial movement relative to said first element, the walls of said bore in said second element being formed with an axially spaced series of concentric grooves for receiving and retaining lubricant, and the lands separating said grooves having an axial dimension not substantially exceeding one-sixteenth inch.

7. The device of claim 6 in which the opposite walls of each of said grooves converge, in cross section, from the lands toward the floor of said grooves.

8. The device of claim 6 in which the opposite walls of each of said grooves are, in cross section, substantially perpendicular to the axis of said bore.

9. A first element having a cylindrical portion and mounted for rotation about the axis of said portion, and a second element having an axial bore therein and sleeved on said portion for rotation relative thereto and for axial movement relative to said first element, said portion being knurled along the axial extent thereof to receive and retain, in the grooves formed by said knurling, lubricant introduced between the walls of said bore and said portion.

References Cited in the file of this patent

UNITED STATES PATENTS

| | | |
|---|---|---|
| 1,646,370 | Reeves | Oct. 18, 1927 |
| 1,648,174 | Williams | Nov. 8, 1927 |
| 2,104,074 | Erbach | Jan. 4, 1938 |
| 2,298,535 | Krag | Oct. 13, 1942 |
| 2,516,829 | Reeves | July 25, 1950 |